(12) United States Patent
Hero et al.

(10) Patent No.: US 11,817,540 B2
(45) Date of Patent: *Nov. 14, 2023

(54) DELIVERY UNIT FOR AN ANODE CIRCUIT OF A FUEL CELL SYSTEM FOR DELIVERING A GASEOUS MEDIUM

(71) Applicant: Robert Bosch GmbH, Stuttgart (DE)

(72) Inventors: Alexander Hero, Lehrensteinsfeld (DE); Armin Merz, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

This patent is subject to a terminal disclaimer.

(21) Appl. No.: 17/426,717

(22) PCT Filed: Jan. 8, 2020

(86) PCT No.: PCT/EP2020/050244
§ 371 (c)(1),
(2) Date: Jul. 29, 2021

(87) PCT Pub. No.: WO2020/156764
PCT Pub. Date: Aug. 6, 2020

(65) Prior Publication Data
US 2022/0102742 A1    Mar. 31, 2022

(30) Foreign Application Priority Data
Jan. 30, 2019   (DE) .................. 10 2019 201 183.7

(51) Int. Cl.
*H01M 8/04*        (2016.01)
*H01M 8/04119*     (2016.01)
(Continued)

(52) U.S. Cl.
CPC .......... *H01M 8/04164* (2013.01); *F04F 5/24* (2013.01); *H01M 8/04228* (2016.02); *H01M 8/04753* (2013.01); *H01M 2250/20* (2013.01)

(58) Field of Classification Search
CPC ......... H01M 8/04164; H01M 8/04753; H01M 2250/20; F04F 5/24
(Continued)

(56) References Cited

U.S. PATENT DOCUMENTS

| 2,203,077 A | 6/1940 | Carpenter |
| 2006/0251935 A1 | 11/2006 | Barrett et al. |

(Continued)

FOREIGN PATENT DOCUMENTS

| DE | 102008058960 A1 | 5/2010 |
| DE | 112009001821 T5 | 6/2011 |

(Continued)

OTHER PUBLICATIONS

Translation of International Search Report for Application No. PCT/EP2020/050244 dated May 12, 2020 (2 pages).

(Continued)

*Primary Examiner* — James M Erwin
(74) *Attorney, Agent, or Firm* — Michael Best & Friedrich LLP

(57) ABSTRACT

Disclosed is a delivery unit (3) for an anode circuit (9) of a fuel cell system (1) for delivering a gaseous medium, in particular hydrogen, from an anode region (38) of a fuel cell (2), said delivery unit (3) comprising at least one recirculation fan (8) and being at least indirectly fluidically connected to the outlet of the anode region (38) by means of at least one connection line (23) and being fluidically connected to the inlet of the anode region (38) by means of an additional (Continued)

connection line (25). According to the invention, in addition to the recirculation fan (8), the delivery unit (3) comprises a jet pump (4), a metering valve (6) and a separator (10) as other components, and the flow contours of the components (4, 6, 8, 10) for the gaseous medium are at least almost entirely arranged in a common housing (7).

18 Claims, 5 Drawing Sheets

(51) Int. Cl.
  *H01M 8/04228* (2016.01)
  *F04F 5/24* (2006.01)
  *H01M 8/04746* (2016.01)
(58) Field of Classification Search
  USPC ............................................. 429/415
  See application file for complete search history.

(56) References Cited

U.S. PATENT DOCUMENTS

| | | |
|---|---|---|
| 2009/0155102 A1 | 6/2009 | Park et al. |
| 2012/0315559 A1 | 12/2012 | Noh et al. |
| 2015/0318562 A1* | 11/2015 | Hausmann ........ H01M 8/04097 |
| | | 429/457 |
| 2017/0077532 A1* | 3/2017 | Noh .................. H01M 8/04604 |
| 2017/0309932 A1* | 10/2017 | Kwon ................. F16K 31/1221 |
| 2022/0093943 A1 | 3/2022 | Altermann et al. |

FOREIGN PATENT DOCUMENTS

| | | |
|---|---|---|
| DE | 102011105710 A1 | 12/2012 |
| DE | 102011114799 A1 | 4/2013 |
| DE | 102012001602 A1 | 8/2013 |
| DE | 102012023828 A1 | 6/2014 |
| DE | 102014105995 A1 | 11/2014 |
| DE | 102017222390 A1 | 6/2019 |
| JP | 2005207395 A | 8/2005 |
| JP | 2005310464 A | 11/2005 |
| JP | 2010014092 A | 1/2010 |
| JP | 2010049914 A | 3/2010 |
| JP | 2010267553 A | 11/2010 |
| JP | 2015011974 A | 1/2015 |
| JP | 2015159005 A | 9/2015 |
| JP | 2018092795 A | 6/2018 |
| JP | 2018097993 A | 6/2018 |
| JP | 2018181682 A | 11/2018 |

OTHER PUBLICATIONS

Translation of International Search Report for Application No. PCT/EP2020/050243 dated May 13, 2020 (2 pages).

* cited by examiner (A - A)

DELIVERY UNIT FOR AN ANODE CIRCUIT OF A FUEL CELL SYSTEM FOR DELIVERING A GASEOUS MEDIUM

BACKGROUND OF THE INVENTION

The present invention relates to a delivery unit for an anode circuit of a fuel cell system for delivering a gaseous medium, in particular hydrogen, which is provided in particular for use in vehicles with a fuel cell drive. The invention furthermore relates to a fuel cell system having a delivery unit of said type.

In the automotive sector, in addition to liquid fuels, gaseous fuels will also play an increasing role in the future. In particular in the case of vehicles with a fuel cell drive, it is necessary for hydrogen gas flows to be controlled. Here, the gas flows are no longer controlled discontinuously, as in the case of the injection of liquid fuel, but the gas is extracted from at least one high-pressure tank and is conducted via an inflow line of a medium-pressure line system to the delivery unit. Said delivery unit conducts the gas via a connecting line of a low-pressure line system to a fuel cell.

DE 10 2011 105 710 B4 has disclosed a delivery unit for a fuel cell system for delivering and/or recirculating a gaseous medium, having a recirculation blower and having a jet pump which is driven by a motive jet of a pressurized gaseous medium, wherein an anode outlet of a fuel cell is fluidically connected to an inlet of the delivery unit, and wherein an outlet of the delivery unit is fluidically connected to an anode inlet of the fuel cell.

DE 10 2014 105 995 A1 has disclosed a fuel cell system for delivering and/or recirculating a gaseous medium, in the case of which the pressurized gaseous medium is fed to a jet pump by means of a dosing valve.

The delivery unit known from DE 10 2011 105 710 B4 and the fuel cell system known from DE 10 2014 105 995 A1 can each have certain disadvantages. Here, the components of the delivery unit, in particular the recirculation blower and/or the jet pump and/or the dosing valve, are at least in part connected to one another and/or to the fuel cell by means of fluidic connections in the form of pipelines and possibly an additional distributor plate with internally situated channels. Here, the components are present at least in part as separate assemblies which are connected to one another by means of pipelines. Here, on the one hand, numerous flow diversions and thus flow losses arise, in particular in all three dimensions in space. In this way, the efficiency of the delivery unit is reduced. Furthermore, the connection of the components of the delivery unit by means of pipelines is disadvantageous insofar as, over the service life of the delivery unit, in particular in the event of intense temperature fluctuations, the pipelines can lead to leaktightness problems, in particular in the case of welded pipelines. On the other hand, as a result of the arrangement of the individual components as, at least in part, separate assemblies, there is the disadvantage that, overall, these form a large surface area in relation to the structural space and/or geometrical volume. This promotes rapid cooling of the components recirculation blower and/or jet pump and/or dosing valve, in particular when the vehicle as a whole is at a standstill for long periods of time, which can lead to increased formation of ice bridges and thus increased damage to the components and/or to the fuel cell system as a whole, which in turn can lead to reduced reliability and/or service life of the delivery unit and/or of the fuel cell system. A further disadvantage is furthermore a poor cold-start characteristic of the delivery unit and/or of the fuel cell system and/or of the vehicle as a whole, because heating energy and/or thermal energy must be introduced in each case individually into the components recirculation blower and/or jet pump and/or dosing valve, wherein the components are arranged remote from one another and thus each component must be separately heated, in particular in the presence of temperatures below 0° Celsius, in order to eliminate possible ice bridges.

SUMMARY OF THE INVENTION

According to the invention, a delivery unit for a fuel cell system is proposed, for delivering and/or recirculating a gaseous medium, in particular hydrogen, wherein the hydrogen will hereinafter be referred to as $H_2$.

Referring to claim 1, the delivery unit is designed such that the delivery unit has a jet pump, a dosing valve and a separator as further components in addition to the component of recirculation blower, wherein the flow contours of the components for the gaseous medium are arranged at least approximately entirely in a common housing. In this way, the advantage can be achieved that a direct and shortest possible flow line can be produced between the components of the delivery unit, in particular between the recirculation blower and/or the jet pump and/or the dosing valve and/or the separator. Furthermore, the number of flow diversions and/or changes in a flow direction of the gaseous medium in the delivery unit can be reduced to as small a number as possible, because the components are positioned in the common housing and thus at a short distance from one another. Here, the inflow openings and the outflow openings of the components recirculation blower and/or jet pump and/or dosing valve and/or separator are arranged in the common housing relative to one another so as to result in a shortest possible length of the flow connections and the fewest possible flow diversions between the components. Here, the flow contours are situated at least approximately entirely in the common housing, and external pipelines and/or external distributor plates can be at least approximately entirely omitted. It is thus possible, on the one hand, for leaks owing to a leaking pipeline system to be reduced, which reduces the likelihood of failure of the delivery unit and/or fuel cell system. On the other hand, it is thus possible for the friction losses and/or flow losses, in particular owing to line lengths and the number of diversions, in the delivery unit and/or fuel cell system to be reduced, whereby the efficiency of the delivery unit and/or of the fuel cell system can be improved.

Furthermore, by means of the arrangement of the flow contours of the components and/or of the components at least approximately entirely in the common housing, it can advantageously be ensured that an overall surface area of the delivery unit, which in particular comprises the components recirculation blower, jet pump, dosing valve and separator, in relation to the structural space and/or geometrical volume can be reduced in size. It is thus possible to achieve the advantage that rapid cooling of the components recirculation blower and/or jet pump and/or dosing valve and/or separator, in particular when the vehicle as a whole is at a standstill for long periods of time, is prevented, which leads to a reduction and/or prevention of the formation of ice bridges. Here, use is advantageously made of the effect that the components recirculation blower and/or jet pump and/or dosing valve and/or separator generate heat during operation, for example by way of the electrical actuator arrangement and/or by way of a magnetic actuator arrangement, wherein this heat can be utilized for preventing all of the components in the common housing from cooling down. Furthermore, by means of the arrangement of the components in the common housing, it is possible, with an altogether reduced volume of the delivery unit, to achieve an improved cold-start capability of the delivery unit and/or of the fuel cell system, in particular when the vehicle as a whole is at a standstill for long periods of time, because less mass has to be heated up, and because the available heat of individual components can be utilized in order to heat the common housing. Here, the likelihood of failure of the delivery unit and/or of the fuel cell system can furthermore be reduced, wherein the service life can be increased. It is furthermore advantageous that the separator does not need to be connected, as a further separate component in the anode circuit, to the components recirculation blower and/or jet pump and/or dosing valve by means of external pipelines and/or external distributor plates.

Advantageous refinements of the delivery device according to the invention are possible by means of the measures specified in the subclaims. The subclaims relate to preferred refinements of the invention.

According to one advantageous embodiment of the delivery unit, the recirculation blower has a compressor wheel with an encircling outer delimiting ring which runs rotationally symmetrically with respect to an axis of rotation of the compressor wheel, and wherein an at least partially encapsulated separation space is situated in the housing of the delivery unit on that side of the compressor wheel which is averted from the axis of rotation. Furthermore, the constituent $H_2O$ and/or the constituent $N_2$ of the gaseous medium is separated off in the recirculation blower, wherein the separation is performed in particular by means of the centrifugal principle in the recirculation blower. In this way, it is possible on the one hand to achieve the advantage that an at least partial encapsulation of at least one side channel and/or of a delivery cell with respect to an outer region in the housing, in particular with respect to the separation space, is realized.

The efficiency of the recirculation blower and thus of the delivery unit can thus be improved. On the other hand, the advantage can be achieved that the heavy constituents can be discharged from a compressor space of the recirculation blower into the separation space, which is situated in particular between the outer delimiting ring of the compressor wheel and the housing, and/or can be discharged further out of the housing of the recirculation blower and the fuel cell system. This offers the advantage that an increase in the efficiency of the recirculation blower and/or of the fuel cell system can be maintained over the entire service life, because the fraction and/or the concentration of $H_2$ in the gaseous medium can be increased, whereas the fraction and/or the concentration of the heavy constituents, in particular $H_2O$ and/or $N_2$, in the gaseous medium can be reduced. Furthermore, the advantage is achieved that, as a result of the heavy constituents being conducted out of the region of the compressor space, a formation of so-called ice bridges between the moving parts, in particular the compressor wheel and the housing, in the shut-down state of the fuel cell system and in particular in the presence of low ambient temperatures is prevented.

Such ice bridges would impede, or entirely prevent, starting of the fuel cell system, in particular of the recirculation blower. It is thus possible for damage to the rotating parts of the recirculation blower, and/or of a drive, in particular of an electric drive, owing to ice bridge formation to be prevented by means of the embodiment according to the invention of the recirculation blower. This leads to increased reliability of the fuel cell system and/or of the vehicle. Through the use of the centrifugal principle for discharging the heavy constituents, the advantage can be achieved that the separation process is improved such that the constituents $H_2O$ and $N_2$ can be separated off at least approximately entirely from the medium, in particular from $H_2$. It can thus be ensured that a the greatest possible fraction of $H_2$ flows back to the fuel cell, whereby, on the one hand, the efficiency and/or the power of a fuel cell can be increased and, on the other hand, less $H_2$ has to be fed to the anode circuit from the outside.

Furthermore, the advantage can be achieved that, for the separation of the constituents $H_2O$ and $N_2$ from the constituent $H_2$, no additional energy and/or only a small amount of energy has to be provided, in particular by the fuel cell system and/or by the superordinate vehicle system. A further introduction of energy, in particular of kinetic energy, into the medium is thus no longer necessary in order to be able to achieve optimum efficiency of the separation process by the recirculation blower by means of the centrifugal principle. In this way, the efficiency of the fuel cell system can be increased, and the operating costs can be reduced.

According to one advantageous refinement of the delivery unit, the constituents $H_2O$ and/or $N_2$ of the gaseous medium may be conducted from the recirculation blower into the separator by means of the centrifugal principle and/or the gravitational principle and/or a pressure difference. In this way, the advantage can be achieved that no further component, such as a pump, for example, needs to be used in order to deliver the constituents $H_2O$ and/or $N_2$ from the recirculation blower into the separator. It is possible solely by means of the existing centrifugal force and/or gravitational force and/or the elevated pressure, which already prevails in the recirculation blower in any case in particular in order to deliver the gaseous medium, to utilize a synergistic effect in order to deliver the constituents $H_2O$ and/or $N_2$ from the recirculation blower into the separator. Furthermore, the separation process and/or further processes in the separator can be further improved by means of the introduced pressure and/or the energy from the recirculation blower, and/or the efficiency can be increased. In this way, the efficiency of the recirculation blower and/or of the separator and/or of the fuel cell system as a whole can be improved.

According to one particularly advantageous refinement of the delivery unit, the recirculation blower and the jet pump are arranged relative to one another in the common housing such that the axis of rotation of the compressor wheel of the recirculation blower runs at least approximately perpendicular to a longitudinal axis of the jet pump. In this way, the advantage can be achieved that the flow losses and/or pressure losses within the delivery unit can be reduced owing to the length of the flow lines and/or the number of flow diversions. It is furthermore advantageous that the flow guidance in the recirculation blower and in the jet pump takes place in parallel planes, wherein this advantageous effect can be improved through the fact that the gaseous medium, when it flows out of the recirculation blower, whereupon the gaseous medium has swirl energy imparted to it in particular in the recirculation blower, is introduced into an intake region of the jet pump in an advantageous manner such that a transfer of momentum and/or jet pump effect in this region, and/or in the region of a mixing pipe of the jet pump, can be improved. Furthermore, a flow diversion of the gaseous medium is furthermore reduced, whereby the flow losses within the delivery unit can be further reduced. In this way, the efficiency of the delivery unit can be improved, in particular at virtually all operating points and/or in the presence of virtually all pressure conditions of the fuel cell system, and the energy expenditure for the operation of the delivery unit can be reduced. Furthermore, by means of the arrangement of the components recirculation blower and jet pump relative to one another, a compact structural form of the delivery unit can be realized, such that the advantage can be achieved that the delivery unit requires less structural space, in particular in the overall vehicle.

Furthermore, by means of the embodiment according to the invention of the delivery unit, the required number of components for the assembly of the delivery unit can be reduced, which in turn leads to a saving of costs for the delivery unit. Furthermore, the likelihood of an assembly error owing to components of the delivery unit being oriented incorrectly relative to one another is reduced, which in turn reduces the likelihood of failure of the delivery unit during operation.

According to one particularly advantageous refinement of the delivery unit, the separator, in particular a collecting vessel of the separator, is fluidically connected at least indirectly to the compressor space and/or to the separation space of the recirculation blower, wherein the connection is realized by means of a discharge channel which runs at least approximately perpendicular to the axis of rotation. In this way, the advantage can be achieved that the heavy constituents of the gaseous medium, in particular $H_2O$ and/or $N_2$, can be discharged directly from the compressor space and/or the separation space of the recirculation blower into the collecting vessel without a further component and/or an external pipeline system and/or an external distributor plate being situated between these. In this way, the flow losses between the collecting vessel of the separator and the compressor space and/or the separation space of the recirculation blower can be reduced. Furthermore, the required energy in the form of a pressure gradient or for generating a mass flow for discharging the heavy constituents from the recirculation blower into the separator is reduced, because the flow losses can be reduced and thus the existing pressure energy and/or acceleration energy from the recirculation blower is approximately sufficient. It is furthermore advantageous that said connection is realized by means of the discharge channel running approximately perpendicular to the axis of rotation. It can be ensured in this way that the centrifugal force which is generated from the rotation of the compressor wheel and which in particular also acts perpendicular to the axis of rotation can have the maximum effect and act with its best possible efficiency on the heavy constituents, in particular during the discharge of these via the discharge channel. The efficiency of the delivery unit and/or of the recirculation blower and/or of the separator can thus be improved.

According to one advantageous refinement, the discharge channel is, in intended use, arranged at a low geodetic height at the recirculation blower, in particular at the separation space. Furthermore, an outflow bore may be arranged in the collecting vessel at a geodetic height that is low in intended use. In this way, the advantage can be achieved that gravitational force can be utilized in order to discharge the heavy constituents out of the separation space and/or out of the collecting vessel. Here, even in the presence of a reduced pressure level in the separation space and/or collecting vessel, it can be ensured that the heavy constituents can be discharged out of the components, and thus out of the delivery unit and/or out of the fuel cell system, at least approximately exclusively by means of gravitational force. It is furthermore possible that, in the case of the arrangement according to the invention of the outflow bore, the collecting vessel of the separator can be at least approximately completely emptied, and thus the heavy constituents can be approximately completely discharged by means of the outflow bore arranged at a low geodetic height. The degree of separation of the undesired heavy constituents can thus be improved, whereby the efficiency of the recirculation blower and/or of the separator and/or of the fuel cell system can be improved.

According to a particularly advantageous refinement, the collecting vessel has the outflow bore, wherein a discharge of $H_2O$ and/or $N_2$ out of collecting vessel via the outflow bore can be controlled by means of a discharge valve. Furthermore, a discharge of $H_2O$ out of the anode circuit as a whole may take place exclusively by means of the discharge valve. Furthermore, a discharge of $N_2$ and/or $H_2$ out of the anode circuit as a whole may takes place exclusively by means of the discharge valve. In this way, in a manner dependent on the operating state of the fuel cell system and/or of the delivery unit and/or of the recirculation blower, it is possible to control when and in what quantity the medium present in the collecting vessel and/or in the anode circuit as a whole, in particular the heavy constituents such as $H_2O$ and/or $N_2$, is/are to be discharged by means of the discharge valve. Here, parameters that may be used for the control of the discharge valve, in each case in the anode circuit and/or in the individual components of the anode circuit, in particular the collecting vessel, may for example be: temperature, pressure, fraction of $H_2O$ and/or $N_2$ in the gaseous medium, operating state of the fuel cell, rotational speed of the recirculation blower, volume flow, mass flow. In this way, the efficiency of the fuel cell system and/or of the delivery unit and/or of the recirculation blower can be improved, and the fraction of $H_2$ separated out of the anode circuit can be reduced, wherein the fraction of $H_2O$ and $N_2$ separated out of the anode circuit can be increased. Furthermore, a discharge of the heavy constituents can be performed such that the operating state and/or the driving situation of the vehicle as a whole can be taken into consideration.

It is furthermore however also possible for the discharge valve to perform the task of a purge valve, in the case of which selectively also a discharge of $H_2O$ and/or $N_2$ and/or $H_2$ from the fuel cell system and/or of the delivery unit and/or of the recirculation blower is performed.

According to one advantageous embodiment, a shut-off valve is situated in the discharge channel, wherein the at least indirect fluidic connection between the recirculation blower and the separator can be opened or closed by means of the shut-off valve. In this way, the advantage can be achieved that an improved discharge of the heavy constituents out of the collecting vessel of the separator can be achieved by virtue of the shut-off valve being opened or closed as required. Here, on the one hand, the shut-off valve can remain closed in order to prevent that, when the discharge valve is open, the gaseous medium escapes from the recirculation blower via the discharge channel into the collecting vessel, wherein, in particular, $H_2$ is prevented from escaping. On the other hand, it is however also possible for the shut-off valve to be opened such that a pressure and/or volume flow out of the recirculation blower, in particular out of the separation space, can be utilized for better evacuation and for the improved discharge of the heavy constituents from the collecting vessel. In this way, the efficiency of the separator can be improved and/or the degree of separation of $H_2O$ and/or $N_2$ with respect to the gaseous medium and/or $H_2$ can be increased, whereby the efficiency of the fuel cell system as a whole can be increased.

According to one particularly advantageous embodiment, a first sensor arrangement and/or a second sensor arrangement are connected to a control device, wherein, in particular, the first sensor arrangement continuously detects parameters of the separator and the second sensor arrangement continuously detects parameters of the recirculation blower, wherein the control device controls the opening and closing of the discharge valve and/or of the shut-off valve in particular on the basis of the parameters detected by the respective sensor arrangement. In this way, the advantage can be achieved that, by means of the actuation, in particular the opening and closing, of the discharge valve and/or of the shut-off valve on the basis of the data detected by the sensor arrangement, the heavy constituents can be discharged out of the anode circuit of the fuel cell system and/or the separation space and/or the collecting vessel as far as possible whenever a certain concentration of heavy constituents in the gaseous medium is detected by means of the sensor arrangement, and/or if a certain pressure level and/or temperature level is detected and/or overshot in various regions of the fuel cell system, in particular in the collecting vessel or in the separating space. Furthermore, a possibly prevailing pressure gradient and/or a flow and/or a mass flow out of the anode circuit, in particular the delivery unit and/or the recirculation blower and/or a first connecting line and/or a second connecting line, can be utilized to discharge the heavy constituents out of the anode circuit in the most efficient manner possible and at least approximately without additional expenditure of energy, and/or to effect a corresponding separation. The efficiency of the fuel cell system can be increased in this way.

The invention is not restricted to the exemplary embodiments described here and to the aspects highlighted therein. Rather, within the scope specified by the claims, a large number of modifications and/or combinations of the features and/or advantages described in the claims are possible which lie within the abilities of a person skilled in the art.

BRIEF DESCRIPTION OF THE DRAWINGS

The invention will be described in more detail below on the basis of the drawing.

In the drawing.

DETAILED DESCRIPTION

Figure 1:
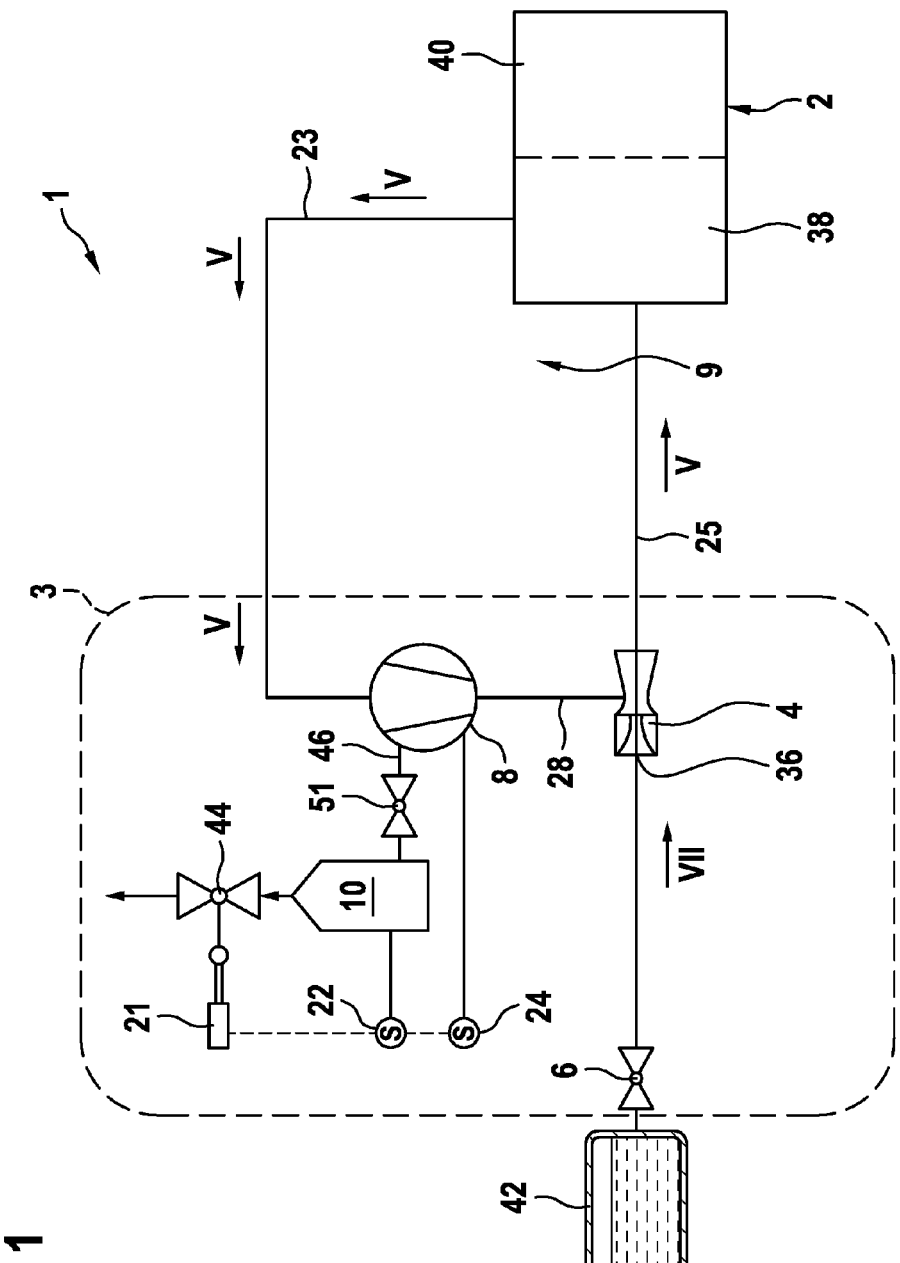
FIG. 1 is a schematic illustration of a fuel cell system according to the invention with a delivery unit.

FIG. 1 is a schematic illustration of a fuel cell system 1 according to the invention with a delivery unit 3.

Here, it is shown in FIG. 1 that the fuel cell system 1 has a fuel cell 2, wherein the fuel cell 2 has an anode region 38 and a cathode region 40. Here, the anode region 38 of the fuel cell 2 is connected to an anode circuit 9, wherein the anode circuit 9 has the delivery unit 3 and a tank 42.

Here, the anode region 38 is fluidically connected to the delivery unit 3 by means of a first connecting line 23, wherein the gaseous medium flows in a flow direction V from the anode region 38 to the delivery unit 3. Here, the delivery unit is fed not only with the recirculate flowing from the anode region 38 of the fuel cell 2 but additionally with a motive medium from the tank 42. After flowing through the delivery unit 3, the gaseous medium that is composed of the recirculate and the motive medium flows in a flow direction V via a second connecting line 25 back to the anode region 38 of the fuel cell.

The delivery unit 3 has a recirculation blower 8, a jet pump 4, a dosing valve 6 and a separator 10. Here, in one exemplary embodiment, the recirculation blower 8 may be fluidically connected by means of the first connecting line 23 to the anode region 38 and/or fluidically connected by means of a discharge channel 46 to the separator 10 and/or connected by means of a first inflow line 28 to the jet pump 4. Furthermore, the jet pump 4 may be connected by means of a second inflow line 36 to the dosing valve 6. Here, the connections may be implemented in particular as integrated flow paths in a common housing 7 (not shown here, see FIG. 2). Furthermore, the dosing valve 6 may be situated between the tank 42 and the jet pump 4. Here, the recirculation blower 8 of the delivery unit 3 delivers an unconsumed recirculate, passing from the fuel cell 2, into the jet pump 4 via the first inflow line 28. Furthermore, pressurized $H_2$, which is in particular a motive medium, is fed in a flow direction VII to the jet pump 4 by means of the dosing valve 6 and flows into the jet pump 4 via the second inflow line 36. Furthermore, a separation of the constituent $H_2O$ and/or of the constituent $N_2$ from the gaseous medium in the anode circuit 9 is performed by means of the recirculation blower 8 and/or by means of the separator 10. Here, a discharge of $H_2O$ and/or $N_2$ from the recirculation blower 8 into the separator 10 may take place. Furthermore, a discharge valve 44 is situated at the separator 10 by means of which the heavy constituents $H_2O$ and/or $N_2$ that have been separated off from the gaseous medium can be discharged from the anode circuit 9 and/or from the fuel cell system 1. Furthermore, a shut-off valve 51 is situated between the recirculation blower 8 and the separator 10, in particular in the region of the discharge channel 46.

Furthermore, it is shown in FIG. 1 that a first sensor arrangement 22 and/or a second sensor arrangement 24 are connected to a control device 21, wherein, in particular, the first sensor arrangement 22 continuously detects parameters of the separator 10 and the second sensor arrangement 24 continuously detects parameters of the recirculation blower 8. Here, the control device 21 controls the opening and closing of the discharge valve 44 and/or of the shut-off valve 51 in particular on the basis of the parameters detected by the sensor arrangement 22, 24. Here, the detected parameters may for example be pressure, temperature, volume flow, concentration of different constituents of the gaseous medium, such as for example $H_2$, $H_2O$, $N_2$ and/or dirt particles. Here, the sensor arrangement 22, 24 may for example also be installed directly on the delivery unit 3. By means of a corresponding logic or calculation method stored on the control device 21, for example in the form of a CPU with a memory unit, a corresponding actuation and/or opening and/or closing of the valve 44, 51 can take place on the basis of the detected data such that an optimum discharge of the heavy constituents out of the anode circuit 9 and/or fuel cell system 1 can be performed, wherein the lightweight constituent $H_2$ can be returned in the greatest possible quantity back into the anode circuit 9.

Figure 2:
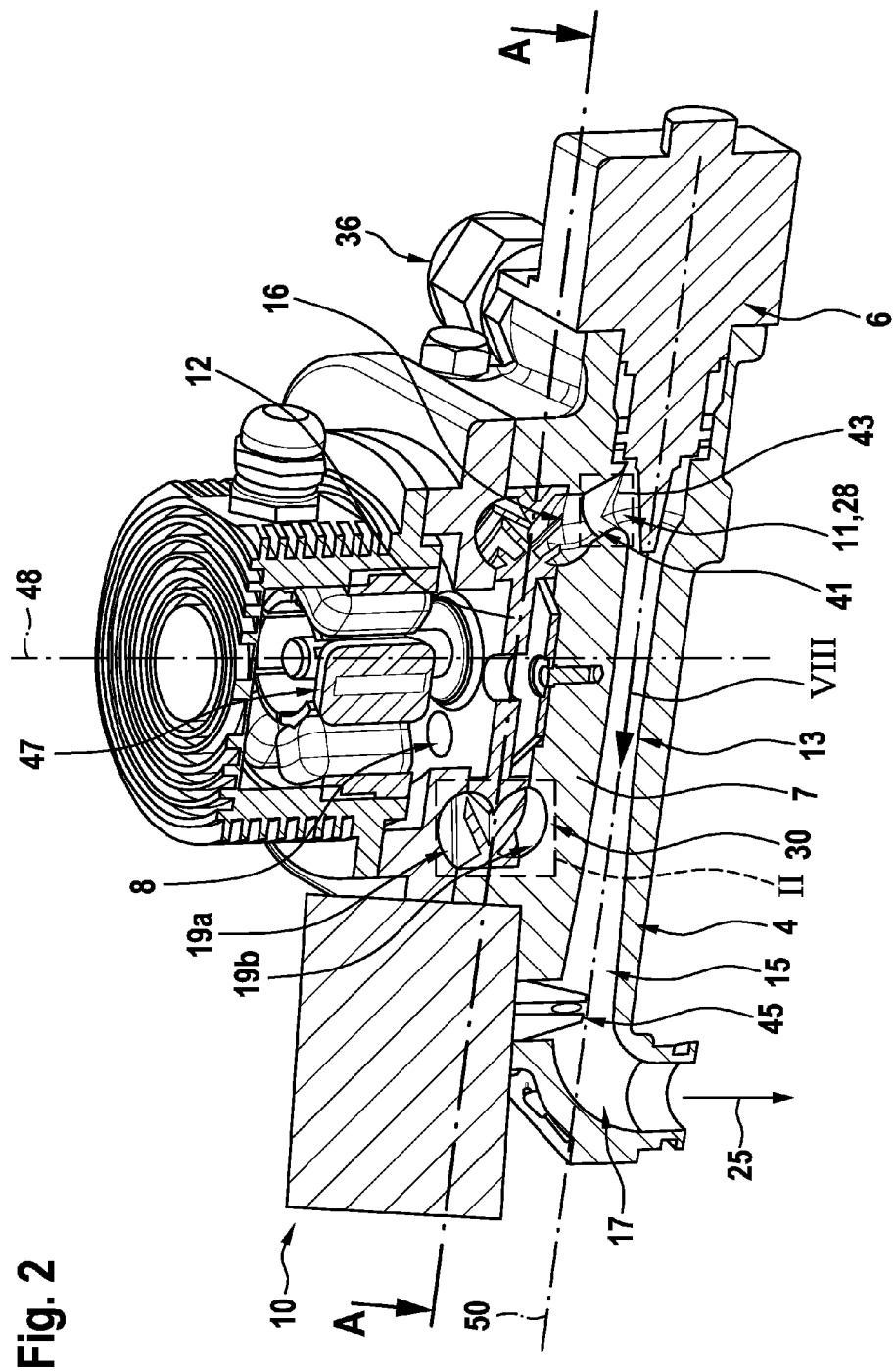
FIG. 2 shows a perspective sectional view of the delivery unit with a recirculation blower, a jet pump, a dosing valve and a separator in a housing.

FIG. 2 shows a perspective sectional view of the delivery unit 3. Here, the delivery unit 3 has the jet pump 4, the dosing valve 6 and the separator 10 as further components in addition to the component of recirculation blower 8, wherein the flow contours of the components 4, 6, 8, 10 for the gaseous medium are arranged at least approximately entirely in the common housing 7.

Here, the recirculation blower 8 has a compressor wheel 12, wherein the compressor wheel 12 is mounted, rotatably about a horizontally running axis of rotation 48, in the housing 7. Here, a drive 47, in particular an electric drive 47, serves as a rotary drive 47 of the compressor wheel 12 and a transmission of the torque and/or of the rotational movement takes place from the drive 47 via, for example, a drive shaft. Furthermore, the housing 7 forms a gas inlet opening 14 (not shown here, see FIG. 3) and a gas outlet opening 16. Here, the gas inlet opening 14 and the gas outlet opening 16 are fluidically connected to one another, in particular via at least one side channel 19. Furthermore, the housing 7 has, in the region of a compressor space 30, a first encircling side channel 19a and/or a second encircling side channel 19b. Here, a multiplicity of delivery cells runs in encircling fashion about the axis of rotation 48 in the compressor wheel 12 in the compressor space 30, which approximately completely encircles the axis of rotation 48, of the housing 7. The drive 47, which is composed in particular of a thermally conductive material, can be advantageously warmed up, which is advantageous in particular during a cold-start procedure of the delivery unit 3 and/or of the vehicle. Here, the drive 47 warms up and, for example owing to its thermal conductivity, transfers the thermal energy to the compressor wheel 12 and further components of the delivery unit 3 and/or the housing 7. Upon a shutdown of the delivery unit 3 and/or of the vehicle, in particular over a relatively long period of time and/or in the presence of low ambient temperatures below the freezing point, the liquid freezes, and ice bridges form. These ice bridges can, upon a start-up and/or upon starting and/or during operation, lead to damage to the delivery unit 3 and/or of the fuel cell system 1. As a result of the heating of the drive 47, the ice bridges melt, and the liquid changes from a solid to a liquid state of aggregation and can be discharged. Here, the arrangement of the drive 47 is such that the introduction of heat into the housing 7 takes place as quickly and efficiently as possible. Here, a specific form of the integrated housing, and the use of composite material for the housing, can in addition lead to improved thermal conductivity. Alternatively, in one exemplary embodiment, the use of thermal effects from the fuel cell 2, in particular a stack, can be used for warming or cooling the integrated housing 7. Furthermore, the actuator arrangement of the dosing valve 6 can be used as heat source, and advantageously acts similarly to the drive 47.

Here, the compressor space 30 of the recirculation blower 8 is fluidically connected via the gas outlet opening 16 and/or the first inflow line 28 to an intake region 11 of the jet pump 4. Here, the first inflow line 28 is formed so as to form an integrated flow channel 41 in the housing 7, wherein said flow channel forms a curvature 43. Here, the curvature 43 is of flow-optimized form such that the friction losses between the gaseous medium and the integrated flow channel 41 can be kept as low as possible. Furthermore, the swirl energy and/or kinetic energy that is imparted to the gaseous medium as a result of its passing through the compressor space 30 in the recirculation blower 8 can be maintained at least approximately without losses as said gaseous flows through the curvature 43 of the integrated flow channel 41. A high efficiency of the delivery unit 3 can thus be realized.

Here, the jet pump 4, in a flow direction VIII that runs in particular along its longitudinal axis 50, has the intake region 11, a mixing pipe 13 and a conically running diffuser region 15 and an outlet manifold 17, wherein the latter is connected to the second connecting line 25. Here, a so-called jet pump effect occurs within the jet pump 4. For this purpose, the gaseous motive medium, in particular $H_2$, flows into the dosing valve 6 from outside the delivery unit 3, in particular from the tank 42, through the second inflow line 36. The motive medium is then introduced, in particular at high pressure, into the intake region 11 by means of an opening of the dosing valve 6. Here, the gaseous motive medium flows in the direction of the flow direction VIII. The $H_2$ which flows from the second inflow line 36 into the intake region 11 and which serves as motive medium has a pressure difference in relation to the recirculation medium that flows from the first inflow line 28 into the intake region 11, wherein the motive medium is in particular at a relatively high pressure of at least 10 bar. In order that the jet pump effect occurs, the recirculation medium is delivered with a low pressure and a small mass flow into the intake region 11 of the jet pump 4. Here, the motive medium flows with the described pressure difference and a high speed, which is in particular close to the speed of sound, through the dosing valve 6 into the intake region 11. Here, the motive medium impinges on the recirculation medium that is already situated in the intake region 11. Owing to the high speed and/or pressure difference between the motive medium and the recirculation medium, internal friction and turbulence are generated between the media. Here, a shear stress arises in the boundary layer between the fast motive medium and the much slower recirculation medium. This stress gives rise to a transfer of momentum, wherein the recirculation medium is accelerated and entrained. The mixing occurs in accordance with the principle of conservation of momentum. Here, the recirculation medium is accelerated in the flow direction VI and a pressure drop also occurs for the recirculation medium, whereby a suction effect occurs and thus a follow-up delivery of further recirculation medium out of the region of the first inflow line 28 and/or of the recirculation blower 8 occurs. By means of a change and/or regulation of the opening duration and of the opening frequency of the dosing valve 6, a delivery rate of the recirculation medium can be regulated and adapted to the respective requirement of the fuel cell system 1 as a whole in a manner dependent on the operating state and operating requirements.

It is furthermore shown in FIG. 2 that, in the region of the diffuser region 15 and/or of the outlet manifold 17, a low-pressure sensor 45 is arranged in space-saving and/or integrated fashion in the housing 7, whereby less structural space is required. It is furthermore shown that the recirculation blower 8 and the jet pump 4 are arranged relative to one another in the common housing 7 such that the axis of rotation 48 of the compressor wheel 12 of the recirculation blower 8 runs at least approximately perpendicular to the longitudinal axis 50 of the jet pump 4.

Figure 3:
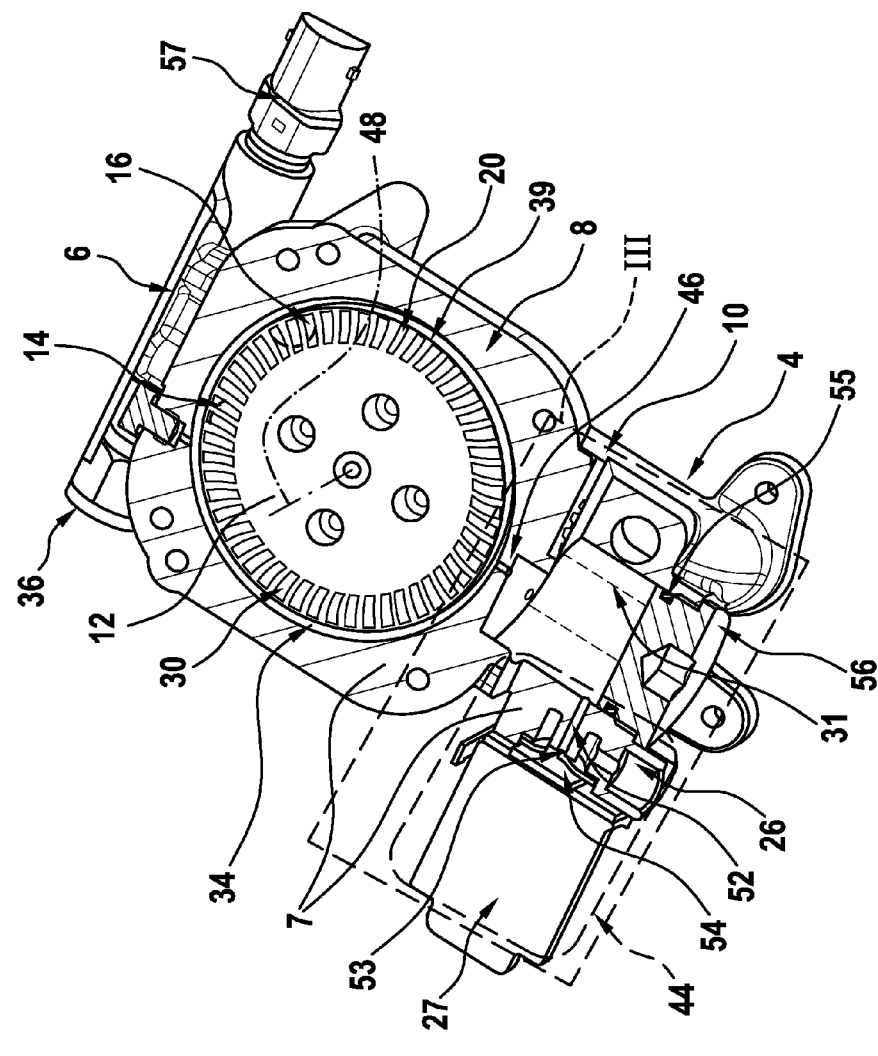
FIG. 3 shows a perspective sectional view, denoted by A-A in FIG. 2, of the delivery unit, in particular of the recirculation blower and of the separator.

FIG. 3 shows a perspective sectional view A-A of the delivery unit 3 with the recirculation blower 8, the jet pump 4 and the dosing valve 6. It is shown here that the delivery unit 3 has the recirculation blower 8, the dosing valve 6 and the separator 10 as further components in addition to the component of jet pump 4, wherein the flow contours of the components 4, 6, 8 for the gaseous medium, and/or the components 4, 6, 8, are arranged at least approximately entirely in the common housing 7. Here, in one exemplary embodiment, the housing 7 may be formed in two parts, three parts or more parts. Here, the individual parts are in particular composed of the same material, and/or have an at least approximately identical coefficient of thermal expansion.

It is furthermore shown in FIG. 3 that the dosing valve 6 has a medium-pressure sensor 57 which detects in particular the pressure of the motive medium that passes out of the tank 42 and flows into the dosing valve 6 via the second inflow line 36. It is furthermore shown that the recirculation blower 8 has the gas inlet opening 14 and the gas outlet opening 16, and the compressor wheel 12. Here, the compressor wheel 12 forms in each case one delivery cell 20 in each case between two blades, wherein the delivery cell 20 has an outer delimiting ring 39 to the outside on the side averted from the axis of rotation 48. Here, a separation space 34 is formed between the housing 7 and the outer delimiting ring 39 of the compressor wheel 12, into which separation space the heavy constituents are separated off, and/or in which separation space said heavy constituents are collected, for example by means of the centrifugal principle owing to their high mass. It is furthermore shown that the separator 10, in particular the collecting vessel 31 of the separator 10, is fluidically connected at least indirectly to the compressor space 30 and/or to the separation space 34 of the recirculation blower 8, wherein the connection is realized by means of a discharge channel 46 which runs at least approximately perpendicular to the axis of rotation 48. The heavy constituents, such as $H_2O$ and/or $N_2$, for example, of the gaseous medium are conducted from the recirculation blower 8, in particular from the separation space 34, into the separator 10 and/or the collecting vessel 31 by means of the centrifugal principle and/or the gravitational principle and/or a pressure difference. The collecting vessel 31 furthermore has an outflow bore 52, wherein a discharge of $H_2O$ and/or $N_2$ out of the collecting vessel 31 via the outflow bore 52 can be controlled by means of the discharge valve 44. Here, the outflow bore 52 is closed at its end averted from the collecting vessel 31 by means of a valve seat 53 of a closing element 54, wherein an opening of the outflow bore 52 and thus of the discharge valve 44 is performed by means of an electrical actuator 27. Here, the valve seat 53 is opened by virtue of the closing element 54 moving away, wherein the closing element 54 is moved by means of the actuator 27. The actuator 27 may furthermore be implemented as an electromagnetic actuator 27. When the valve seat 53 is open and/or the discharge valve 44 is open, the gaseous medium, in particular the heavy constituents, flow onward into a region which serves as a connection 26 to an onward-leading line, which for example delivers the heavy constituents back into a cathode region 40 of the fuel cell 2. Alternatively, the heavy constituents may however also be discharged into the environment.

It is furthermore shown in FIG. 3 that the collecting vessel 31 that is situated in the common housing 7 is closed by means of a closure screw 56, wherein, for better encapsulation of the collecting vessel 31, a sealing element 55 is situated between the housing 7 and the closure screw 56. The use of the closure screw 56 offers manufacturing advantages and advantages in terms of production costs. Furthermore, in one exemplary embodiment, the low-pressure sensor 45 and/or the medium-pressure sensor 57 may be part of the first sensor arrangement 22 and/or of the second sensor arrangement 24.

In one exemplary embodiment of the delivery unit 3, a discharge of $H_2O$ out of the anode circuit 9 as a whole may take place exclusively by means of the discharge valve 44. In a further exemplary embodiment of the delivery unit 3, a discharge of $N_2$ and/or $H_2$ out of the anode circuit 9 as a whole may take place exclusively by means of the discharge valve 44. Further drain valves and/or purge valves thus do not need to be provided in the anode circuit 9, whereby the costs of the delivery unit 3 can be reduced.

Figure 4:
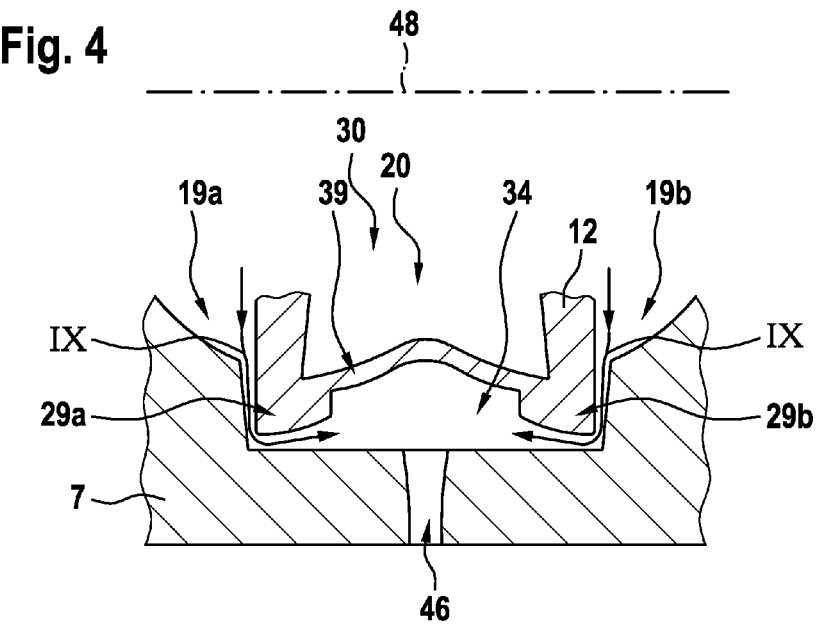
FIG. 4 shows a detail, denoted by II in FIG. 3, of a compressor space and/or of a separation space of the recirculation blower.

FIG. 4 shows a detail, denoted by II in FIG. 2, of the compressor space 30 of the recirculation blower 8 with the compressor wheel 12. It is shown here that the compressor wheel 12 has the encircling outer delimiting ring 39 which runs rotationally symmetrically with respect to the axis of rotation 48 of the compressor wheel 12. Here, a separation space 34 which is at least partially encapsulated, in particular with respect to the at least one side channel 19, and/or the discharge channel 46, is situated in the housing 7 of the recirculation blower 8 and/or of the delivery unit 3 on that side of the compressor wheel 12 which is averted from the axis of rotation 48. Here, the compressor wheel 12 is shown, which, in the region of the outer delimiting ring 39, has at least one externally situated encircling annular collar 29a, b. Said externally situated annular collar 29a, b runs radially in relation to the axis of rotation 48 and on that side of the outer delimiting ring 39 which is averted from the axis of rotation 48. Here, the at least one externally situated annular collar 29a, b is, axially and/or radially in relation to the axis of symmetry 49, at least approximately in contact with the housing upper part 7 and/or the housing lower part 8 of the housing 7 and/or forms a small gap therewith, which at least approximately cannot be overcome by the gaseous medium. By virtue of the fact that a small gap can form between the compressor wheel 12 with the at least one externally situated encircling annular collar 29a, b and the housing 7, an at least partial encapsulation of the at least one side channel 19 with respect to the separation space 34 can be realized. The separation space 34 is formed, at least partially in encircling fashion about the axis of rotation 48, between the housing 7 and the outer delimiting ring 39. With increasing rotational speed of the compressor wheel 12, the forces acting on the heavy constituents of the gaseous medium in the compressor space 30, in particular a centrifugal force, become so high that the heavy constituents flow in a flow direction IX from the respective side channel 19a, b and/or the compressor space 30, through between the respective annular collar 29a, b and the housing 7, into the separation space 34. The heavy constituents are thus discharged out of the region of the at least one side channel 19 and of the delivery cell 20 and collected in the region of the separation space 34. The constituent $H_2O$ and/or the constituent $N_2$ is thus separated off from the gaseous medium in the recirculation blower 8, wherein the separation takes place in particular by means of the centrifugal principle in the recirculation blower 8. These heavy constituents of the gaseous medium may for example be an undesired waste product and/or by-products from the operation of the fuel cell system 1, such as, for example, $N_2$ and/or $H_2$ and/or dirt particles. As a result of the discharge of the heavy constituents, the delivery and compression action of the delivery unit 3 can be increased, because the fraction of the gaseous medium to be delivered, in particular $H_2$, which is required for the generation of electricity in the fuel cell 2, in the delivery cell 20 and the at least one side channel 19 is increased. In this way, the efficiency of the delivery unit 3 can be increased, because no heavy constituents, which are undesired for operation, have to be delivered concomitantly.

It is furthermore shown in FIG. 4 that, in intended use, the discharge channel 46 is arranged at a low geodetic height at the recirculation blower 8, in particular at the separation space 34.

Figure 5:
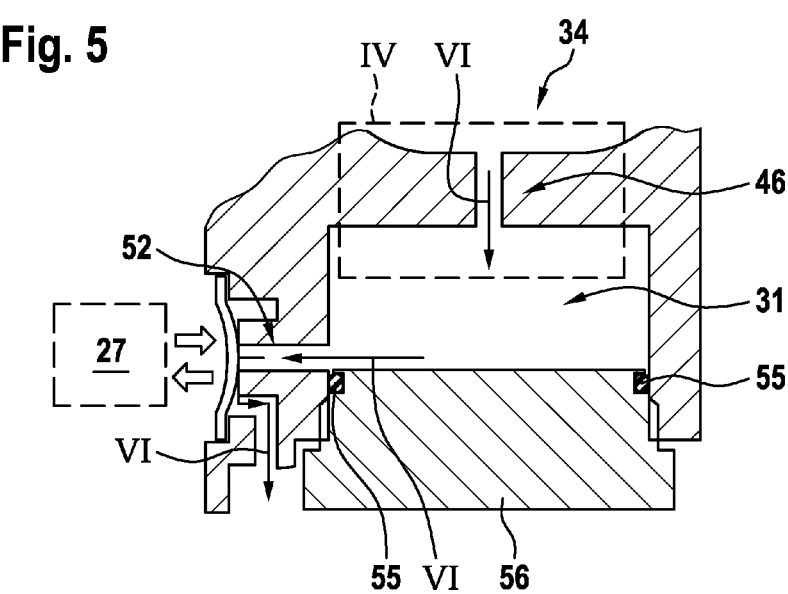
FIG. 5 shows a detail, denoted by III in FIG. 3, of the separator.

FIG. 5 shows a detail of the separator 10 that is denoted by III in FIG. 3. It is shown here that the separation space 34 is at least indirectly fluidically connected via the discharge channel 46 to the collecting vessel 31 of the separator 10. Here, the separation space 34 and/or the discharge channel 46 can form an elevated pressure level in relation to the collecting vessel 31 of the separator 10, and wherein a discharge of $H_2O$ and/or $N_2$ from the recirculation blower 8 into the separator 10 takes place in the flow direction VI. Here, in intended use, the outflow bore 52 is arranged at a low geodetic height in the collecting vessel 31. The heavy constituents of the gaseous medium that have collected in the collecting vessel 31 are discharged via the outflow bore 52 into a region outside the delivery unit 3. For the opening or closing of the outflow bore 52 and thus of the collecting vessel 31 of the separator 10, the actuator 27 is actuated, wherein said actuator 27 is part of the discharge valve 44.

Figure 6:
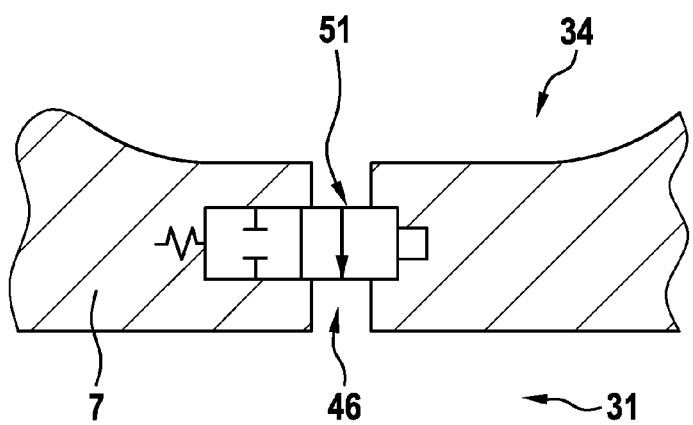
FIG. 6 shows a detail, denoted by IV in FIG. 5, of the recirculation blower and of the separator with a discharge channel.

It is shown in FIG. 6 that the shut-off valve 51 is situated in the discharge channel 46, wherein the at least indirect fluidic connection between the recirculation blower 8, in particular the separation space 34, and the separator 10 can be opened or closed in particular by means of the shut-off valve 51.

The invention is not restricted to the exemplary embodiments described here and to the aspects highlighted therein. Rather, within the scope specified by the claims, a large number of modifications are possible which lie within the abilities of a person skilled in the art.

What is claimed is:

1. A delivery unit (3) for an anode circuit (9) of a fuel cell system (1) for delivering a gaseous medium out of an anode region (38) of a fuel cell (2), wherein the delivery unit (3) comprises at least one recirculation blower (8), wherein the delivery unit (3) is at least indirectly fluidically connected by at least one connecting line (23) to an outlet of the anode region (38), and wherein the delivery unit (3) is fluidically connected by a further connecting line (25) to an inlet of the anode region (38), characterized in that the delivery unit (3) also comprises a jet pump (4), a dosing valve (6) and a separator (10), wherein the flow contours of the jet pump (4), the dosing valve (6), the recirculation blower (8) and the separator (10) for the gaseous medium are arranged in a common housing (7), and
wherein the recirculation blower (8) has a compressor wheel (12) with an encircling outer delimiting ring (39) which runs rotationally symmetrically with respect to an axis of rotation (48) of the compressor wheel (12), and wherein an at least partially encapsulated separation space (34) is situated in the housing (7) of the delivery unit (3) on a side of the compressor wheel (12) which is averted from the axis of rotation (48).

2. The delivery unit (3) as claimed in claim 1, characterized in that a constituent $H_2O$ and/or a constituent $N_2$ of the gaseous medium is separated off in the recirculation blower (8).

3. The delivery unit (3) as claimed in claim 2, characterized in that the constituents $H_2O$ and/or $N_2$ of the gaseous medium are conducted from the recirculation blower (8) into the separator (10) by the centrifugal principle and/or the gravitational principle and/or a pressure difference.

4. The delivery unit (3) as claimed in claim 1, characterized in that the recirculation blower (8) and the jet pump (4) are arranged relative to one another in the common housing (7) such that the axis of rotation (48) of the compressor wheel (12) of the recirculation blower (8) runs at least approximately perpendicular to a longitudinal axis (50) of the jet pump (4).

5. The delivery unit (3) as claimed in claim 1, characterized in that a collecting vessel (31) of the separator (10) is fluidically connected, by a discharge channel (46) which runs at least approximately perpendicular to the axis of rotation (48), at least indirectly to a compressor space (30) and/or to the separation space (34) of the recirculation blower (8).

6. The delivery unit (3) as claimed in claim 5, characterized in that the discharge channel (46) is, during normal use of the delivery unit, arranged at a low geodetic height at the recirculation blower (8).

7. The delivery unit (3) as claimed in claim 5, characterized in that the collecting vessel (31) has an outflow bore (52), wherein the delivery unit further comprises a discharge valve (44) configured to control a discharge of $H_2O$ and/or $N_2$ out of the collecting vessel (31) via the outflow bore (52).

8. The delivery unit (3) as claimed in claim 7, characterized in that the outflow bore (52) is arranged in the collecting vessel (31) at a geodetic height that is low during normal use of the delivery unit.

9. The delivery unit (3) as claimed in claim 7, characterized in that a discharge of $H_2O$ out of the anode circuit (9) as a whole takes place exclusively via the discharge valve (44).

10. The delivery unit (3) as claimed in claim 7, characterized in that a discharge of $N_2$ and/or $H_2$ out of the anode circuit (9) as a whole takes place exclusively via the discharge valve (44).

11. The delivery unit (3) as claimed in claim 5, characterized in that a shut-off valve (51) is situated in the discharge channel (46), wherein the shut-off valve is configured to open or close the at least indirect fluidic connection between the recirculation blower (8) and the separator (10).

12. The delivery unit (3) as claimed in claim 9, characterized in that a first sensor arrangement (22) and/or a second sensor arrangement (24) are connected to a control device (21), wherein the first sensor arrangement (22) continuously detects parameters of the separator (10) and the second sensor arrangement (24) continuously detects parameters of the recirculation blower (8), wherein the control device (21) is configured to control the opening and closing of the discharge valve (44) and/or of the shut-off valve (51) on the basis of the parameters detected by the sensor arrangement (22, 24).

13. A vehicle for the supply of electrical energy to a traction drive and/or secondary consumers, the vehicle comprising the fuel cell system (1) as claimed in claim 1.

14. The delivery unit (3) as claimed in claim 1, wherein the gaseous medium is hydrogen.

15. The delivery unit (3) as claimed in claim 1, characterized in that a constituent $H_2O$ and/or a constituent $N_2$ of the gaseous medium is separated off in the recirculation blower (8), wherein the separation is performed by the centrifugal principle in the recirculation blower (8).

16. The delivery unit (3) as claimed in claim 5, characterized in that the discharge channel (46) is, during normal use of the delivery unit, arranged at a low geodetic height at the separation space (34).

17. A delivery unit (3) for an anode circuit (9) of a fuel cell system (1) for delivering a gaseous medium out of an anode region (38) of a fuel cell (2), wherein the delivery unit (3) comprises at least one recirculation blower (8), wherein the delivery unit (3) is at least indirectly fluidically connected by at least one connecting line (23) to an outlet of the anode region (38), and wherein the delivery unit (3) is fluidically connected by a further connecting line (25) to an inlet of the anode region (38), characterized in that the delivery unit (3) also comprises a jet pump (4), a dosing valve (6) and a separator (10), wherein the flow contours of the jet pump (4), the dosing valve (6), the recirculation blower (8) and the separator (10) for the gaseous medium are arranged in a common housing (7), and wherein a constituent $H_2O$ and/or a constituent $N_2$ of the gaseous medium is separated off in the recirculation blower (8).

18. A delivery unit (3) for an anode circuit (9) of a fuel cell system (1) for delivering a gaseous medium out of an anode region (38) of a fuel cell (2), wherein the delivery unit (3) comprises at least one recirculation blower (8), wherein the delivery unit (3) is at least indirectly fluidically connected by at least one connecting line (23) to an outlet of the anode region (38), and wherein the delivery unit (3) is fluidically connected by a further connecting line (25) to an inlet of the anode region (38), characterized in that the delivery unit (3) also comprises a jet pump (4), a dosing valve (6) and a separator (10), wherein the flow contours of the jet pump (4), the dosing valve (6), the recirculation blower (8) and the separator (10) for the gaseous medium are arranged in a common housing (7), and wherein the recirculation blower (8) and the jet pump (4) are arranged relative to one another in the common housing (7) such that an axis of rotation (48) of a compressor wheel (12) of the recirculation blower (8) runs at least approximately perpendicular to a longitudinal axis (50) of the jet pump (4).

* * * * *